US008947713B2

(12) United States Patent
Komori

(10) Patent No.: US 8,947,713 B2
(45) Date of Patent: Feb. 3, 2015

(54) SYSTEM, METHOD AND SERVER

(71) Applicant: Takumi Komori, Tokyo (JP)

(72) Inventor: Takumi Komori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/871,303

(22) Filed: Apr. 26, 2013

(65) Prior Publication Data
US 2013/0314742 A1 Nov. 28, 2013

(30) Foreign Application Priority Data

May 22, 2012 (JP) ................................. 2012-116175

(51) Int. Cl.
G06F 3/12 (2006.01)
H04N 1/00 (2006.01)
H04N 1/32 (2006.01)

(52) U.S. Cl.
CPC ............ G06F 3/1296 (2013.01); G06F 3/1221 (2013.01); G06F 3/1239 (2013.01); G06F 3/126 (2013.01); G06F 3/1288 (2013.01); H04N 1/00244 (2013.01); H04N 1/00344 (2013.01); H04N 1/00832 (2013.01); H04N 1/00888 (2013.01); H04N 1/32502 (2013.01); H04N 2201/0094 (2013.01)
USPC ....................................................... 358/1.15

(58) Field of Classification Search
None
See application file for complete search history.

(56) References Cited

U.S. PATENT DOCUMENTS 7,457,907 B2   11/2008   Takahashi et al.
7,796,999 B1*   9/2010   Martin et al. ............... 455/456.1
7,948,437 B2   5/2011   Torimoto et al.
8,374,515 B2   2/2013   Shioyasu et al.
2005/0117719 A1*   6/2005   Hyotani et al. ............ 379/90.01
2009/0165072 A1*   6/2009   Wright-Riley ................ 725/127
2012/0182589 A1   7/2012   Komori
2013/0310087 A1*   11/2013   Ramprasad et al. .......... 455/466

FOREIGN PATENT DOCUMENTS

JP   2009-037591   2/2009
JP   4296302   7/2009
JP   2011-051315   3/2011
JP   2011-065548   3/2011

OTHER PUBLICATIONS

Japan Aerospace Exploration Agency (Feb. 28, 2012), "Quasi-Zenith Satellite System Navigation Service—Interface Specification for QZSS version 1.4".*

* cited by examiner

Primary Examiner — Kimberly A Williams
Assistant Examiner — John Wallace
(74) Attorney, Agent, or Firm — Harness, Dickey & Pierce, P.L.C.

(57) ABSTRACT

A system has information processing devices and a server which controls information processing executed by the devices. One of the devices includes a querying part to transmit a query to the server whether the device is permitted to execute the information processing, a notifying part to notify the server of location information indicating a location of the device, and an executing part to execute the information processing in response to an instruction from the server. The server includes a receiving part to receive the query from the device, an identifying part to identify an area in which the device exists according to the information notified by the device which has transmitted the query, and an instructing part to instruct the device which has transmitted the query to execute the information processing based on how many other devices are executing the information processing in the area.

11 Claims, 18 Drawing Sheets

| AREA | MAXIMUM EXECUTION NUMBER | EXECUTION NUMBER |
|---|---|---|
| AREA A | 1 | 1 |
| AREA B | 1 | 0 |
| AREA C | 1 | 0 |
| AREA D | 0 | 0 |
| AREA E | 1 | 1 |
| .. | .. | .. |

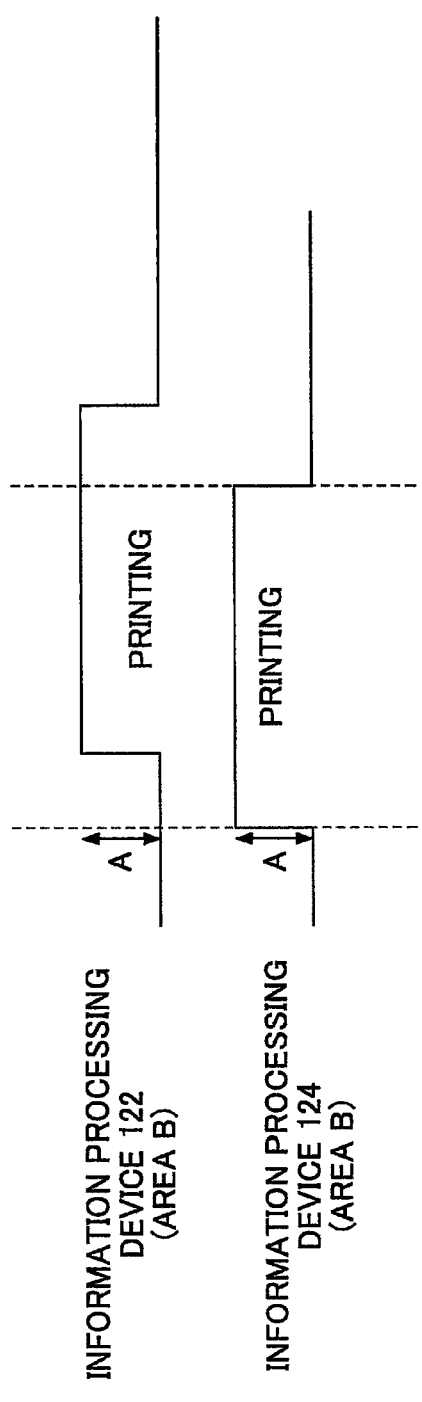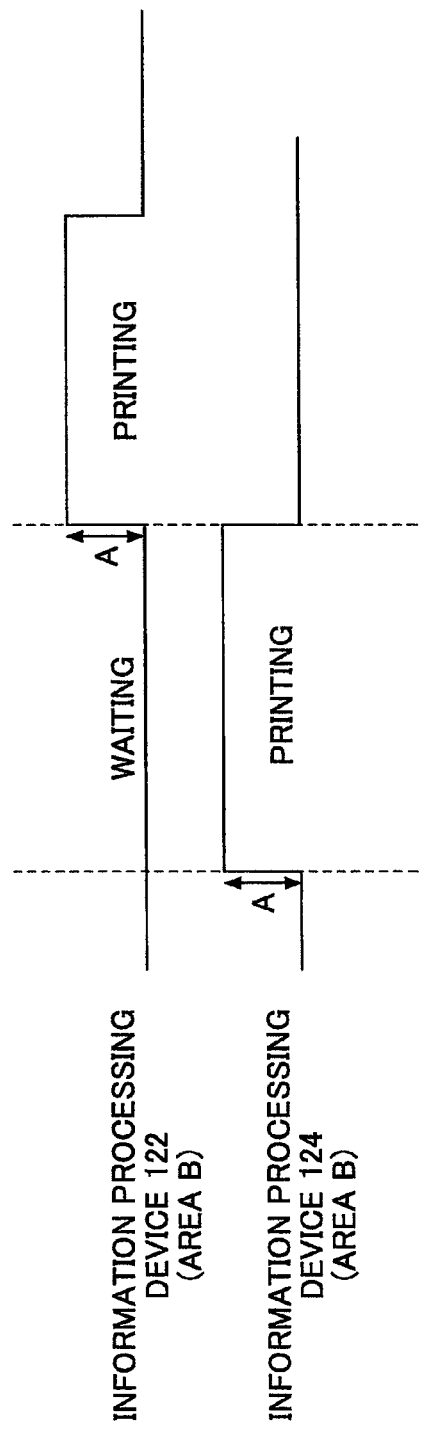

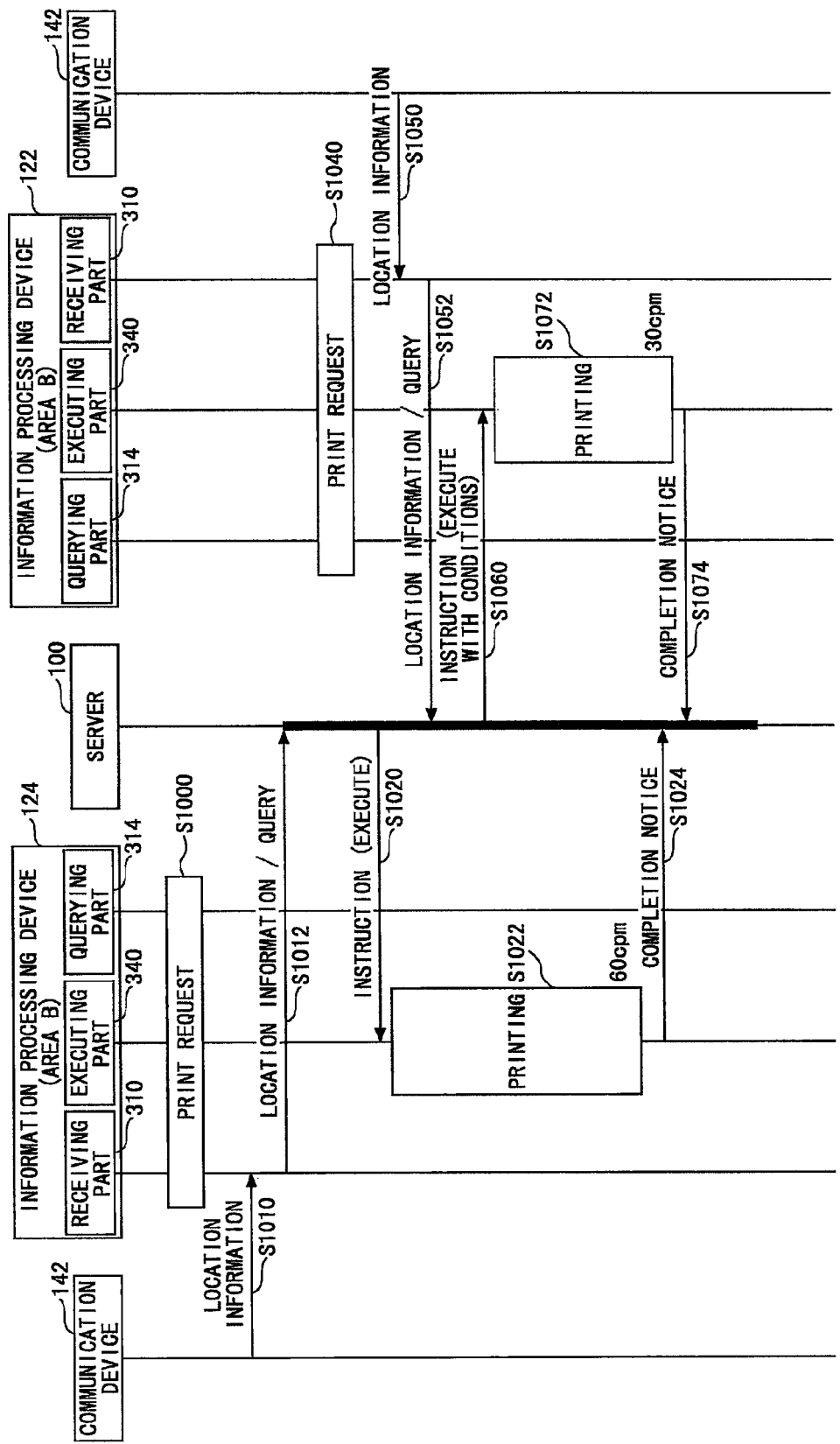

| EXECUTION NUMBER | CONDITIONS |
|---|---|
| 0 | 60cpm |
| 1 | 30cpm |
| 2 | 25cpm |
| 3 | 20cpm |
| .. | .. |

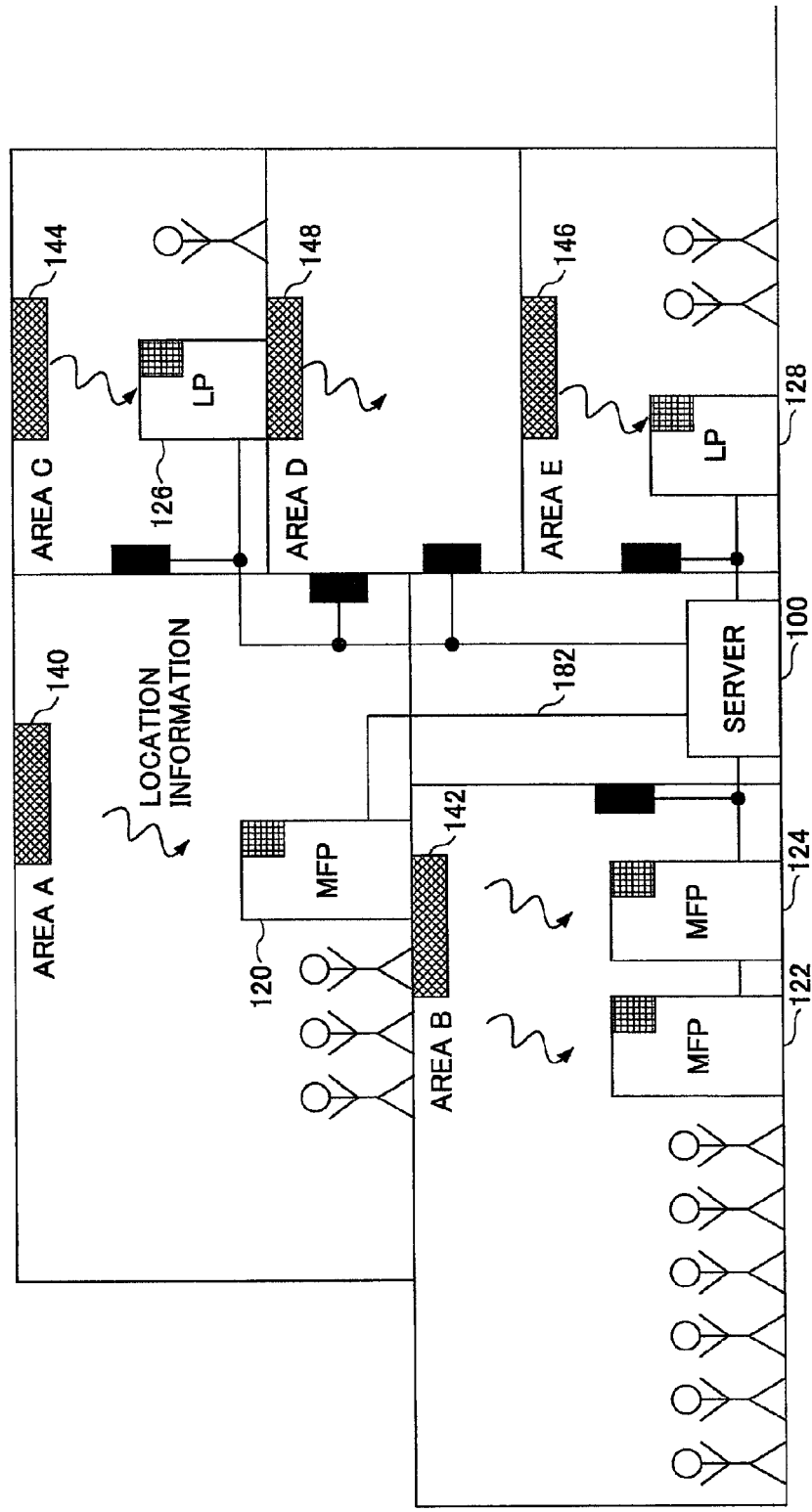

| AREA | MAXIMUM EXECUTION NUMBER | EXECUTION NUMBER |
|---|---|---|
| AREA A | 1 | 1 |
| AREA B | 1 | 0 |
| AREA C | 1 | 0 |
| AREA D | 0 | 0 |
| AREA E | 1 | 1 |
| .. | .. | .. |

FIG.18

| NUMBER OF PEOPLE | MAXIMUM EXECUTION NUMBER |
|---|---|
| ~5 | 1 |
| 5~ | 2 |

| AREA | MAXIMUM EXECUTION NUMBER | EXECUTION NUMBER |
|---|---|---|
| AREA A | 1 | 1 |
| AREA B | 2 | 1 |
| AREA C | 1 | 0 |
| AREA D | 0 | 0 |
| AREA E | 1 | 1 |
| .. | .. | .. |

FIG.22

| TIME | MAXIMUM EXECUTION NUMBER |
|---|---|
| 9:00-12:00 | 2 |
| 12:00-13:00 | 1 |
| 13:00-17:00 | 3 |
| 17:00-21:00 | 2 |
| 21:00-09:00 | 1 |

SYSTEM, METHOD AND SERVER

BACKGROUND OF THE INVENTION

1. Field of the Invention

The present invention relates to a system, method and server. In addition, the present invention specifically relates to a system, method and server which control an execution of predetermined information processing for an information processing device.

2. Description of the Related Art

Various methods are proposed in order to decrease energy consumption of an information processing device such as a printer or multifunction peripheral (MFP) installed in an office.

Japanese Laid-Open Patent Application No. 2011-065548 discloses a method to decrease energy consumption of an entire system having plural information processing devices. In the method, each of the information processing devices has a role of either an exclusive master device or a slave device, and when one of the slave devices detects an event to transition to an active state, the roles of this slave device and a master device are reversed.

Japanese Laid-Open Patent Application No. 2011-051315 discloses a system which switches the roles of a master device and a slave device based on a simulation of energy consumption of an entire system, which is triggered by a state transition of an information processing device, so as to decrease the energy consumption.

In an office environment, an adequate number of the above mentioned information processing devices are installed in office areas according to the number of people (or occupants). It is desirable that such information processing devices are managed and controlled separately for each office area so as to decrease their energy consumption. However, the methods disclosed in the above-noted patent applications may not sufficiently control the information processing devices and thereby decrease their energy consumption based on their installed locations.

On the other hand, Japanese Laid-Open Patent Application No. 2009-037591 discloses a method to obtain information (e.g. location information of the information processing devices) about installed locations of the information processing devices. The method controls output of image data by using location information which is obtained by an image forming device having a global positioning system (GPS) receiver. However, it is generally difficult to obtain location information by GPS in an office environment.

Japanese Patent No. 4296302 and "Quasi-Zenith Satellite System Navigation Service Interface Specification for QZSS version 1.4" provided by Japan Aerospace Exploration Agency disclose a technology to obtain location information indoors with the Indoor Messaging System (IMES). The locations in which the information processing devices are installed may be found by means of the location information obtained by the IMES technology.

However, there is no conventional method to control the actions of information processing devices in an office-area by means of their location information so as to decrease their energy consumption.

An embodiment of this invention aims to control peak energy consumption of information processing devices based on locations in which the information processing devices are installed.

SUMMARY OF THE INVENTION

In one embodiment, a system including:
information processing devices; and
a server which controls information processing executed by the information processing devices;
wherein one of the information processing devices includes
a querying part to transmit a query to the server whether the one of the information processing devices is permitted to execute the information processing,
a notifying part to notify the server of location information indicating a location of the one of the information processing devices, and
an executing part to execute the information processing in response to an instruction from the server, and
wherein the server includes
a receiving part to receive the query from the one of the information processing devices,
an identifying part to identify an area in which the one of the information processing devices exists according to the location information notified by the one of the information processing devices which has transmitted the query, and
an instructing part to instruct the one of the information processing devices which has transmitted the query to execute the information processing based on how many other information processing devices are executing the information processing in the area.

In another embodiment, a method to control information processing executed by one of information processing devices, the method including:
transmitting a query to a server whether the one of the information processing devices is permitted to execute the information processing;
notifying the server of location information indicating a location of the one of the information processing devices;
receiving the query from the one of the information processing devices,
according to the location information notified by the one of the information processing devices which has transmitted the query, identifying an area in which the information processing device exists;
instructing the one of the information processing devices which has transmitted the query to execute the information processing based on how many other information processing devices are executing the information processing in the area; and
executing the information processing in response to an instruction from the server.

In another embodiment, a server controlling information processing executed by one of information processing devices, the server including:
a receiving part to receive a query about whether the one of the information processing devices is permitted to execute the information processing from the one of the information processing devices;
an identifying part to, according to location information notified by the one of the information processing devices which has transmitted the query, identify an area in which the one of the information processing devices exists; and
an instructing part to instruct the one of the information processing devices which has transmitted the query to execute the information processing based on how many other information processing devices are executing the information processing in the area.

According to an embodiment of this invention, energy consumption of the information processing may be controlled based on locations in which the information processing devices are installed.

BRIEF DESCRIPTION OF THE DRAWINGS

Other objects and further features of embodiments may become apparent from the following detailed description when read in conjunction with the accompanying drawings, in which:

FIG. 9A is a timing chart illustrating an effect produced by a system according to an embodiment of the invention;

FIG. 9B is a timing chart illustrating an effect produced by a system according to an embodiment of the invention;

FIG. 10 is a sequence diagram illustrating a sequence of actions of a system according to an embodiment of the invention;

FIG. 15 is a drawing illustrating a system according to an embodiment of the invention;

FIG. 18 is a drawing illustrating a table to manage the number of information processing devices for the number of users in a certain location according to an embodiment of the invention;

FIG. 22 is a drawing illustrating a table to manage the number of information processing devices by time unit in an embodiment of the invention.

DESCRIPTION OF THE PREFERRED EMBODIMENTS

Figure 1:
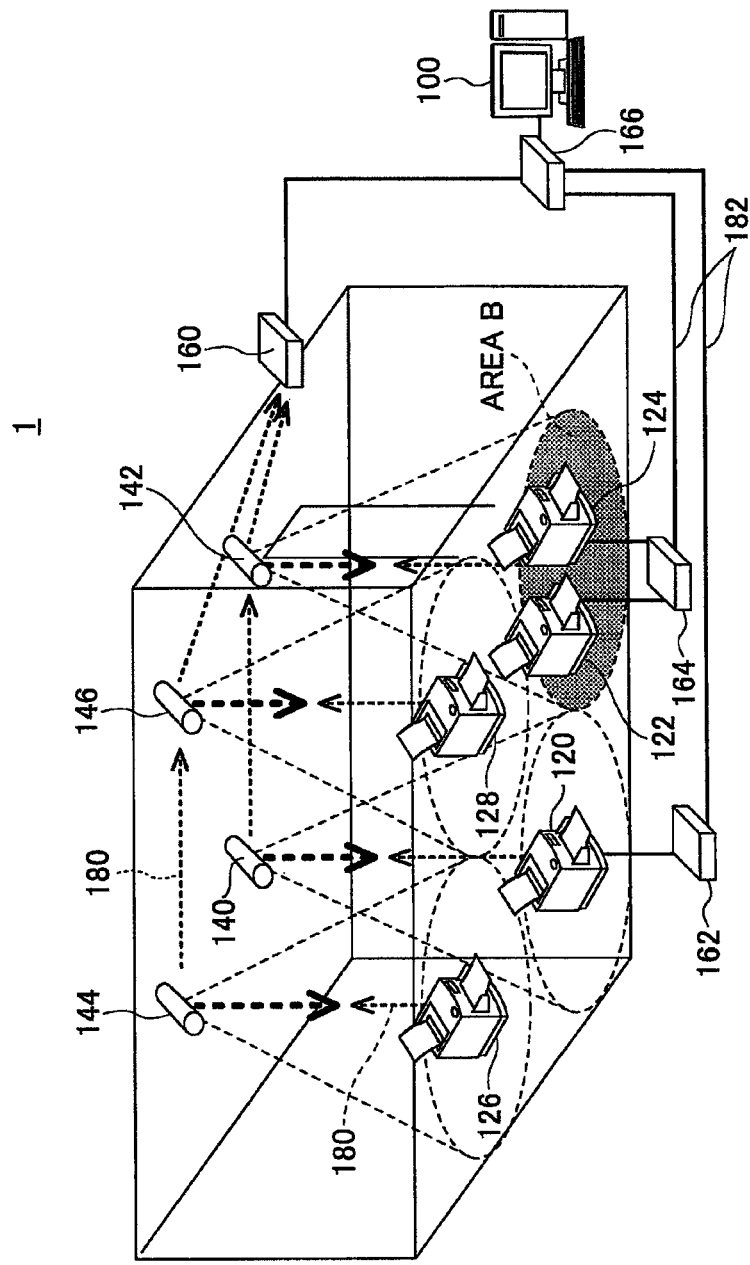
FIG. 1 is a schematic drawing illustrating a system according to an embodiment of the invention.

In the following, embodiments of the present invention will be described with reference to the accompanying drawings.
1. Overview
2. Hardware
3. Functions
4. Sequence of Actions of a System
4.1 First Example of Sequence
4.2 Second Example of Sequence
4.3 Third Example of Sequence
4.4 Fourth Example of Sequence
1. Overview FIG. 1 shows an office including plural areas (e.g. rooms, compartments or booths) in which a system 1 according to an embodiment of the invention is installed. FIG. 1 schematically describes a room consisting of four areas in which various devices are installed, and the devices are connected to a server situated outside of the room via a network.

A server 100, information processing devices 120, 122, 124, 126, and 128, communication devices 140, 142, 144, and 146, a gateway 160, and routers 162, 164, and 166 are illustrated in FIG. 1. One or more information processing devices 120, 122, 124, 126, and 128 may form a wireless communication network 180 such as a Personal Area Network (PAN) with the communication devices 140, 142, 144, and 146 and the gateway 160. The information processing devices may communicate with the server 100.

The one or more information processing devices 120, 122, 124, 126 and 128 may be connected to a network 182 such as Local Area Network (LAN) via the Routers 162 and 164. Therefore, the information processing devices 120, 122, 124, 126, and 128 are connected to the network 180 and/or the network 182 and may communicate with the server 100 via either of the networks 180 or 182.

The information processing devices 120, 122, 124, 126 and 128 may execute certain information processing. The execution of the information processing by the information processing devices 120, 122, 124, 126 and 128 are centrally managed by the server 100. The information processing devices 120, 122, 124, 126 and 128 query the server 100 in advance whether they may are permitted to execute the information processing. Based on a response from the server 100, they may execute the information processing.

The information processing may include a process to realize a printer function to print data on a paper or a facsimile function to send facsimile data to an external device via a network. It should be appreciated that information processing in the disclosed technology is not limited to a particular example. However, for the purpose of easy understanding of this invention, this specification uses an example in which the information processing devices 120, 122, 124, 126 and 128 are Multifunction Peripherals (MFPs) or Laser Printers (LP).

The communication devices 140, 142, 144 and 146 may be installed to a ceiling of the room, and may transmit location information (e.g. a set of a latitude, a longitude, a floor number, and a building number specifying the location in which the communication device is installed). Each of the communication devices may be placed in a separable case and operate on power provided by an existing power source. Alternatively, each of the communication devices may be incorporated in a lighting device such as a LED fluorescent tube and operate on power provided from the lighting device.

Each of the communication devices 140, 142, 144, and 146 transmits a wireless signal indicating the location information in a predetermined area of coverage. The predetermined area of coverage is determined by signal strength of the wireless signal. Each of the communication devices is located to cover a target area of the respective device, and each of the target areas may be configured not to overlap. In case that the target areas overlap, a receiver which receives the location information may be configured to select one of the communication devices based on strength of the signal. Each circular cone illustrated with dashed lines in FIG. 1 shows the predetermined area. The location information may be transmitted by IMES.

Furthermore, the communication devices 140, 142, 144, and 146 have a function to form PAN 180 so that they may relay (or route) a communication between each of the information processing devices 120, 122, 124, 126, and 128 and the server 100. Any communication methods for the communication may be used (e.g. ZigBee). In this case, each of the communication devices 140, 142, 144, and 146 may operate as a ZigBee Router in a ZigBee network.

Each of the information processing devices 120, 122, 124, 126, and 128 may receive the wireless signal transmitted by the nearest one of the communication devices 140, 142, 144, and 146. The information processing device may receive the location information according to the IMES standard. Each of the information processing devices 120, 122, 124, 126, and 128 sends the received location information to the server 100 before sending a query to the server 100 of whether it is allowed to execute the information processing. Each of the information processing devices 120, 122, 124, 126, and 128 may send the query and the location information to the server 100 via the PAN 180 or the LAN 182. When the information processing devices 120, 122, 124, 126, and 128 send the location information via the PAN 180, they operate as a ZigBee End Device.

The server 100 receives the query about whether one of the information processing devices (e.g. the information processing device 122 belonging to an Area B depicted in FIG. 1) may execute the information processing. The server 100 then responds according to a status of an other information processing device (e.g. the information processing device 124 belonging to Area B). For example, when the information processing device 122 sends the query and the information processing device 124 is executing the information processing, the server 100 may instruct the information processing device 122 to wait for completion of the information processing of the information processing device 124. Alternatively, when the information processing device 122 sends the query and the information processing device 124 is executing the information processing, the server 100 may respond to the information processing device 122 by indicating that the information processing device 122 may conditionally execute the information processing (e.g. by decreasing printing efficiency from 60 copy per minute (cpm) to 30 cpm).

Thus the server 100 may control the execution of the information processing of the information processing device on an area-specific basis and suppress a rise of total energy consumption in the area.

The gateway 160 connects the network 180 with the network 182, and transforms data transmitted from the network 180 so as to adapt the network 182. When the network 180 is the PAN according to ZigBee and the network 182 is a LAN according to IEEE 802.3 standard, the gateway 160 may transform the data communicated between them.

According to an embodiment of the invention, the server 100 may control the execution of the information processing of the information processing devices based on their installed locations by receiving the query about the execution and the location information from them. As a result, the system 1 according to an embodiment of the invention may control energy consumption on an area-specific basis.

2. Hardware

Figure 2:
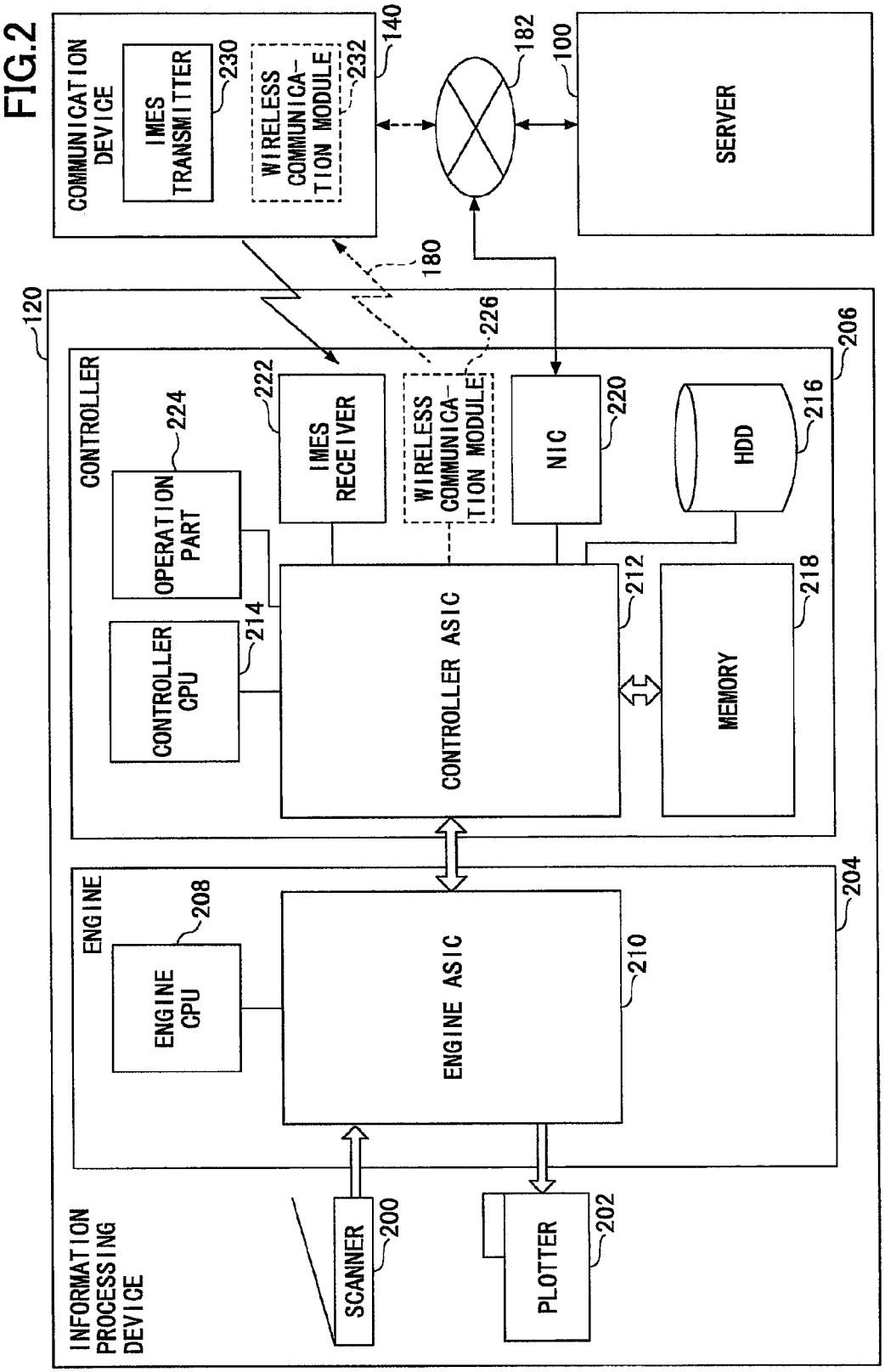
FIG. 2 is a schematic drawing illustrating an exemplary hardware construction of a system according to an embodiment of the invention.

FIG. 2 shows an exemplary hardware construction of the system 1 according to an embodiment of the invention. Hardware of the server 100, the information processing device 120, and the communication device 140 is shown in FIG. 2.

The server 100 described in FIG. 2 is a computer having a CPU, a main memory (e.g. RAM), a auxiliary storage unit (e.g. HDD), a display device (e.g. LCD display), an input device (e.g. keyboard and/or mouse), a communication module (e.g. Network Interface Card (NIC)). The server 100 receives from the information processing device 120 the query about whether the device may execute the information processing and the location information. The server 100 then responds to the information processing device 120 according to a status of other information processing device(s) belonging to the same area.

The information processing device 120 described in FIG. 2 is a MFP having a Scanner 200, a Plotter 202, an Engine 204, and a Controller 206. The scanner 200 transfers data obtained by a scan to the Engine 204. The Plotter 202 receives printing data from the Engine 204 and prints on paper.

The Engine 204 has an Engine CPU 208 and an Engine Application Specific Integrated Circuit (ASIC) 210. The Engine ASIC 210 performs scanner image processing (e.g. shading correction) for the data from the scanner 200 and transfers it to the Controller 206. In addition, the Engine ASIC 210 receives the printing data from the Controller 206, performs plotter image processing (e.g. error diffusion), and transfers it to the Plotter 202. The Engine CPU 208 performs resister configuration and interrupt handling operation on the Engine ASIC 210.

The Controller 206 has a Controller ASIC 212, a Controller CPU 214, a HDD 216, a Memory 218, a NIC 220, a IMES Receiver 222, an Operation Part 224, and a Wireless Communication Module 226. The Controller ASIC 212 transfers the data in the Engine ASIC 210 to the Memory 218, and after image compression of the data, stores the data in the HDD 216. In addition, the Controller ASIC 212 read the data stored in the HDD 216, and after image extraction of the data, transfers the data to the Engine ASIC 210. The HDD 216 stores the data such as scanned data. The Memory 218 is used to temporarily store the data or intermediate data for compression. The Controller CPU 214 performs resister configuration and interrupt handling operation on the Controller ASIC 212.

The IMES Receiver 222 obtains the location information transmitted from an IMES Transmitter 230 of the communication device. The NIC 220 is used for communication with the server 100 via the LAN. The Operation Part 224 is used to accept an operation from a user. The Wireless Communication Module 226 is used for communication with the server 100 with the communication device via the PAN. The Wireless Communication Module 226 may be a ZigBee Communication Module, for example.

The communication device 140 described in FIG. 2 has the IMES transmitter 230 and a Wireless Communication Module 232. The IMES Transmitter 230 transmits the wireless signal indicating the location information according to the IMES standard. The Wireless Communication Module 232 may be a ZigBee Communication Module which may relay a communication between each of the information processing devices and the server 100.

According to the above mentioned construction, the system 1 according to an embodiment of the invention may specify the area of one of the information processing devices and control its processing based on the status of other information processing devices in the same area.

The information processing device 120 described in FIG. 2 may choose either of two paths: a path via the NIC 220 or via the Wireless Communication Module 226. Either of the paths may be used in a system 1 according to an embodiment of the invention. Using the NIC 220 brings in a stable, broad, and fast communication.

On the contrary, using the Wireless Communication Module 226 brings in reduction of energy consumption for wireless communication. This is because the Wireless Communication Module 226 may use a minimum of power to communicate with the nearest communication device. It is especially advantageous when energy consumption of the information processing device 120 should be minimized due to the reason that it may not be powered by an external power source.

Thus, the information processing device 120 may have either of the NIC 220 or the Wireless Communication Module 226.

3. Functions

Figure 3:
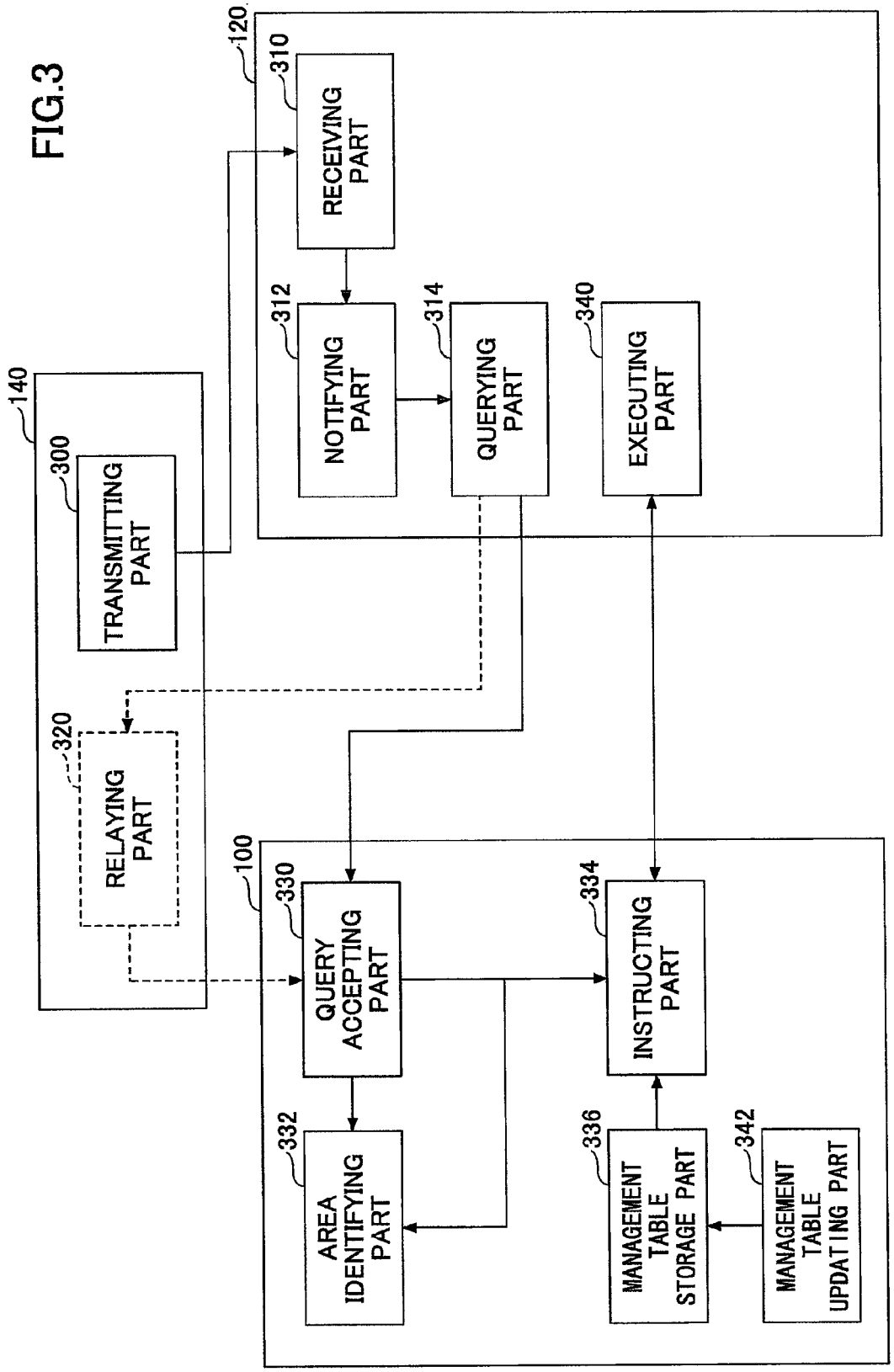
FIG. 3 is a functional block diagram illustrating a system according to an embodiment of the invention.

FIG. 3 shows a functional block diagram of the system 1 according to an embodiment of the invention; some of elements which each device in FIG. 3 has are illustrated, which are especially related to an explanation of an embodiment of the invention. The following description is done based on FIG. 4 (or FIG. 17 or FIG. 20) which describes the system 1 in two dimensions for the purpose of more intuitive understanding.

Figure 4:
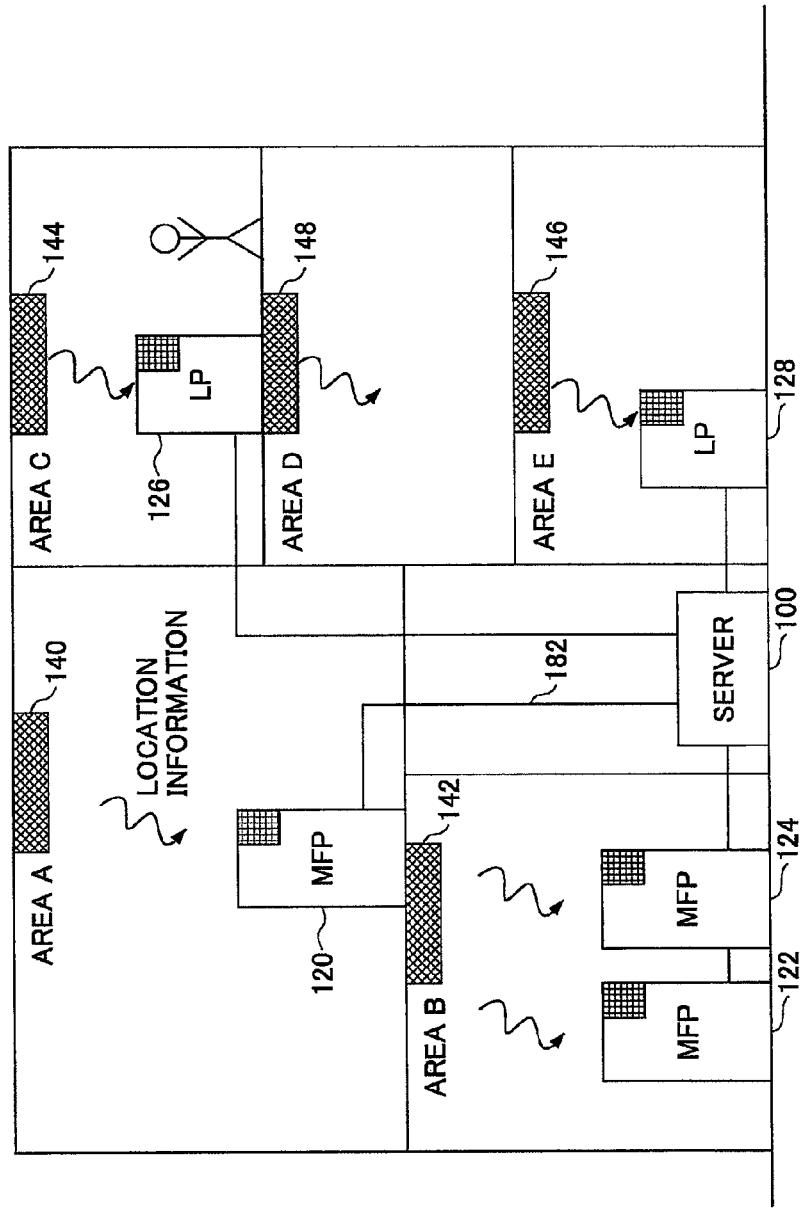
FIG. 4 is a drawing illustrating a system according to an embodiment of the invention.

FIG. 4 illustrates an office space including plural areas (e.g. Area A, B, C, D, and E). The server 100, the information processing devices 120, 122, 124, 126, and 128 of either MFPs or LPs (henceforth only the information processing device 120 is described), the communication devices 140, 142, 144, 146, and 148 (henceforth only the communication device 140 is described) are shown in FIG. 4. The server 100 and the information processing device 120 illustrated in FIG. 4 communicate each other via the network 182 which is not the PAN 180. However, the server 100 and the information processing device 120 may communicate with the PAN 180 as stated above.

The communication device 140 described in FIG. 3 has a transmitting part 300 and a relaying part 320.

The transmitting part 300 continues to transmit the wireless signal to a predetermined area according to the frame format and communication protocol defined in the IMES standard. The wireless signal includes location information about a location in which the communication device 140 is installed (e.g. a set of a latitude, a longitude, a floor number, and a building number).

The relaying part 320 relays the query of an execution of the information processing and the location information transmitted by the information processing device 120 to the server 100. In addition, the relaying part 320 relays a response to the query, which is transmitted by the server 100, to the information processing device 120. The gateway 160 may exist on a network path between the communication device 140 and the server 100 in order to transform a communication between different kinds of networks.

The relaying part 320 is used when the server 100 and the information processing device 120 communicate each other via the network 180 such as a PAN (illustrated with dashed line in FIG. 3). That eliminates the need for cables for a wired LAN by communication of the information processing device 120 with the server 100 via the relaying part 320 of the communication device 140. Furthermore, that results in reduction of energy consumption because the information processing device 120 does not need to connect with a wired LAN.

The information processing device 120 described in FIG. 3 has a receiving part 310, a notifying part 312, a querying part 314, and an Execution Part 340. The receiving part 310 receives the location information transmitted by the transmitting part 300 of the communication device 140. The receiving part 310 may receive the location information at predetermined intervals, at a predetermined time, or at the time when a certain event occurs, etc.

The notifying part 312 transmits the location information received by the receiving part 310 to the server 100. The location information may be conveyed to the server 100 while included in the query sent by the querying part 314 or may be transmitted in association with the query. The location information may be conveyed via either a LAN or a PAN in which the communication device 140 relays the information. According to the configuration of the system, it is determined which network is used. The location information received by the receiving part 310 may be formed according to the format defined by the IMES standard. However, the location information may be converted into any other format.

The querying part 314 queries the server 100 whether the information processing device 120 may execute a certain information processing or not. The information processing may include, but is not limited to, a process for printing or submitting a facsimile. The following example is concretely described with the process for printing as the information processing.

The querying part 314 queries the server 100 whether the information processing device 120 may execute the printing on receipt of a print request from a user terminal. Any format may be used for data of the query provided that the format includes a device name or a device ID to identify the information processing device and an identifier to indicate that this data is the query to ask whether the information processing device may execute the function or not. In addition, the location information is transmitted to the server 100 either with or in the query. The location information may be included in the data of the query. Alternatively, the location information may be transmitted separately from the query. In this case, the query and the location information need to be linked and transmitted within a certain time period in order that the server 100 may respond to the query based on the location information.

The executing part 340 executes the information processing or waits for the execution according to an instruction included in the Server response for the query of the querying part 314. Examples of the instruction from the server 100 are shown below:

(1) Execute—The device may execute the process instantly.
(2) Wait—The device shall wait for the following instruction to execute the process.
(3) Execute with conditions—The device may execute the process with specified conditions (e.g. execution efficiency or performance).

The executing part 340 notifies the server 100 of completion of the execution according to the instruction from the server 100. Then the executing part 310 may also transmit the location information received by the receiving part 310. It is preferable to convey the notification of completion of the execution via a communication path used by the querying part 314.

The server 100 described in FIG. 3 has a query accepting part 330, an area identifying part 332, an instructing part 334, a management table storage part 336, and a management table updating part 342.

The query accepting part 330 receives the query about the execution of the information processing transmitted by the information processing device 120. In addition, The query accepting part 330 receives the location information associated with or included in the query.

The area identifying part 332 identifies an area in which the information processing device 120 having transmitted the query belongs to by means of the location information received by the query accepting part 330. For example, the location information transmitted by the MFP 120 illustrated in FIG. 4 indicates Area A. The Server may identify the area in which MFP 120 belongs to by referring to information which associates location information (e.g. a set of a latitude, a longitude, a floor number, and a building number) with an area (location).

The instructing part 334 instructs the information processing device 120 about the execution of the information processing. The instruction part 334 determines conditions for the execution based on the number of other information processing devices executing the information processing in the area in which the information processing device 120 belongs to. In the system 1, the maximum number of the information processing devices executing the information processing in parallel (hereinafter referred to as the "maximum execution number") is defined on an area-specific basis in advance.

The instructing part 334 compares the maximum execution number with the number of the information processing devices actually executing the information processing at the time when the query is received (the execution number), and then determines the conditions for the execution of the information processing device 120. A method to determine the conditions is described in detail later.

Any format may be used for data of the instruction including the condition of the information processing. The format may include at least a predefined identifier indicating a kind of the instruction (e.g. Execute, Wait or Execute with conditions). It is preferable to convey the instruction via a communication path which the information processing device 120 has used for transmitting the query. After the information processing device 120 receives the instruction from the instructing part 334, the information processing device 120 may execute the information processing according to the instruction.

The instructing part 334 receives a completion notice from the information processing device 120 when the information processing device 120 completes the execution of the information processing. The instructing part 334 may know the execution number by receiving the completion notice.

The management table storage part 336 stores a table indicting the following information:
(1) A management table of execution numbers associating the maximum execution number with the execution number on an area-specific basis (e.g. FIG. 7, FIG. 16, FIG. 21);
(2) A management table of conditions (on an area-specific basis) associating the execution number with the condition (restriction) for execution of the information processing (e.g. FIG. 12);
(3) A definition table of the maximum execution number to the number of people (on an area-specific basis) associating the number of people in the area with the maximum execution number (e.g. FIG. 18); and
(4) A definition table of the maximum execution number to time (on an area-specific basis) associating time with the maximum execution number (e.g. FIG. 22).

An example of a method to determine the conditions for execution by the instructing part 334 is described in detail below.

The management table updating part 342 updates the management table of execution numbers (1) according to either the definition table of the maximum execution number to the number of people (3) or the definition table of the maximum execution number to time (4). The update may be done at any time such as, but not limited to, at a predetermined intervals or at predetermined time). The third example and fourth example shown below describe the update process in detail.

As stated above, the server 100 in the system 1 according to this embodiment of the invention may control the number of the information processing devices executing at the same time in each area. Thus the server 100 may control, on an area-specific basis, energy consumption of the information processing devices belonging to the area.

4. Sequence of Actions of a System

With four examples, the following description shows a sequence of procedures performed by the system 1 according to an embodiment of the invention.

4.1 First Example of Sequence

The first example is described by referring to FIG. 5 through 9. In the first example, the server 100 controls an execution of print processing by information processing devices (MFPs) 122 and 124 so as not to be executed in parallel in Area B.

Figure 5:
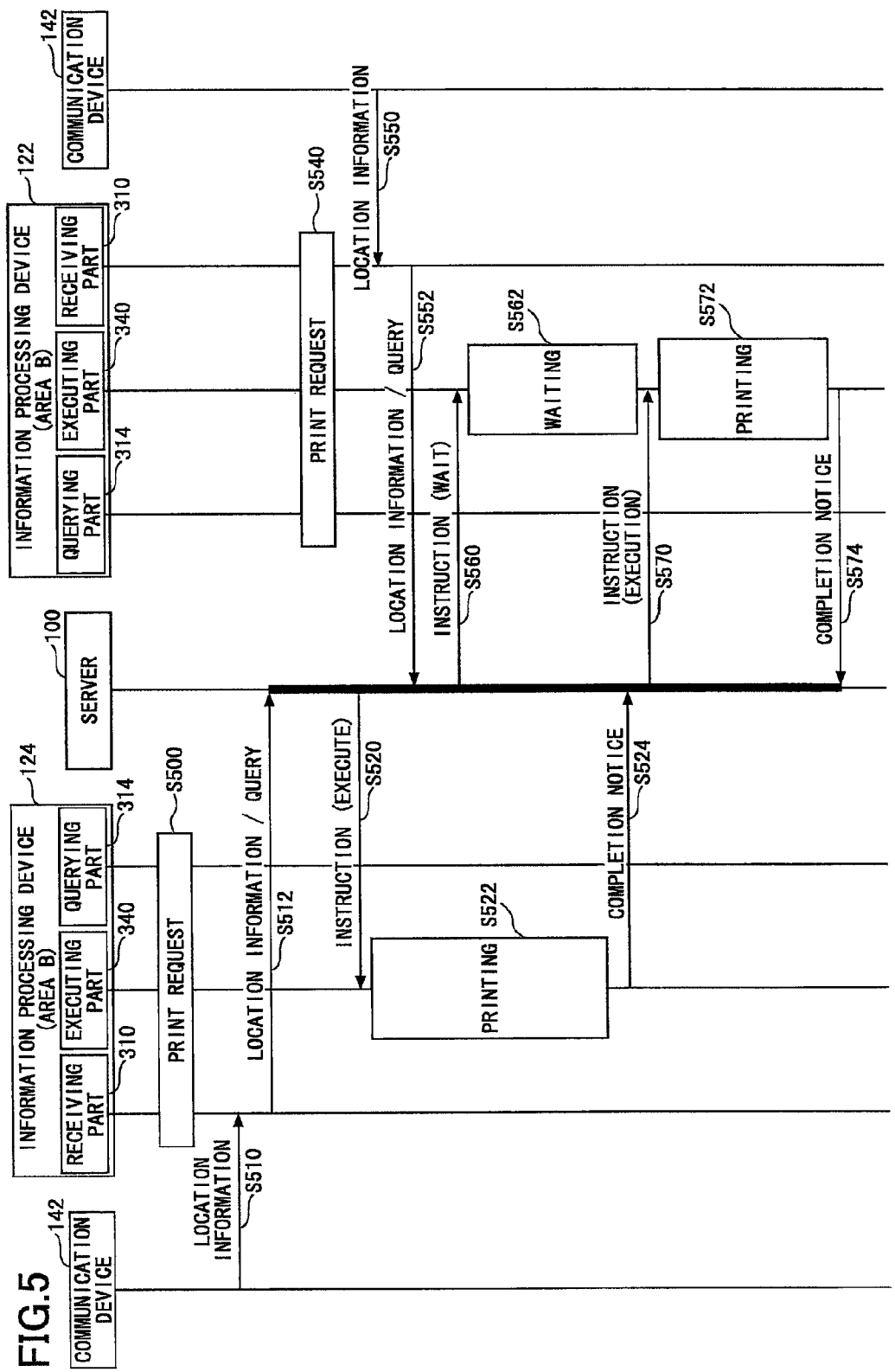
FIG. 5 is a sequence diagram illustrating a sequence of actions of a system according to an embodiment of the invention.

FIG. 5 shows a sequence of actions of the system 1. The construction of the server 100, the information processing devices 120, 122, 124, 126, and 128, the communication device 140, 142, 144, 146, and 148, and the network 182 is illustrated in FIG. 4.

In response to a print request from the user terminal (S510), the querying part 314 of the information processing device 124 sends a query to the server 100 whether execution of the print processing is allowed. The notifying part 312 transmits location information received by the receiving part 310 at S510 from the communication device 142 to the server 100 with or in the query (Step S512). The receiving part 310 may receive the location information at any time (e.g. soon after or just before a request for the print processing occurs).

Figure 6:
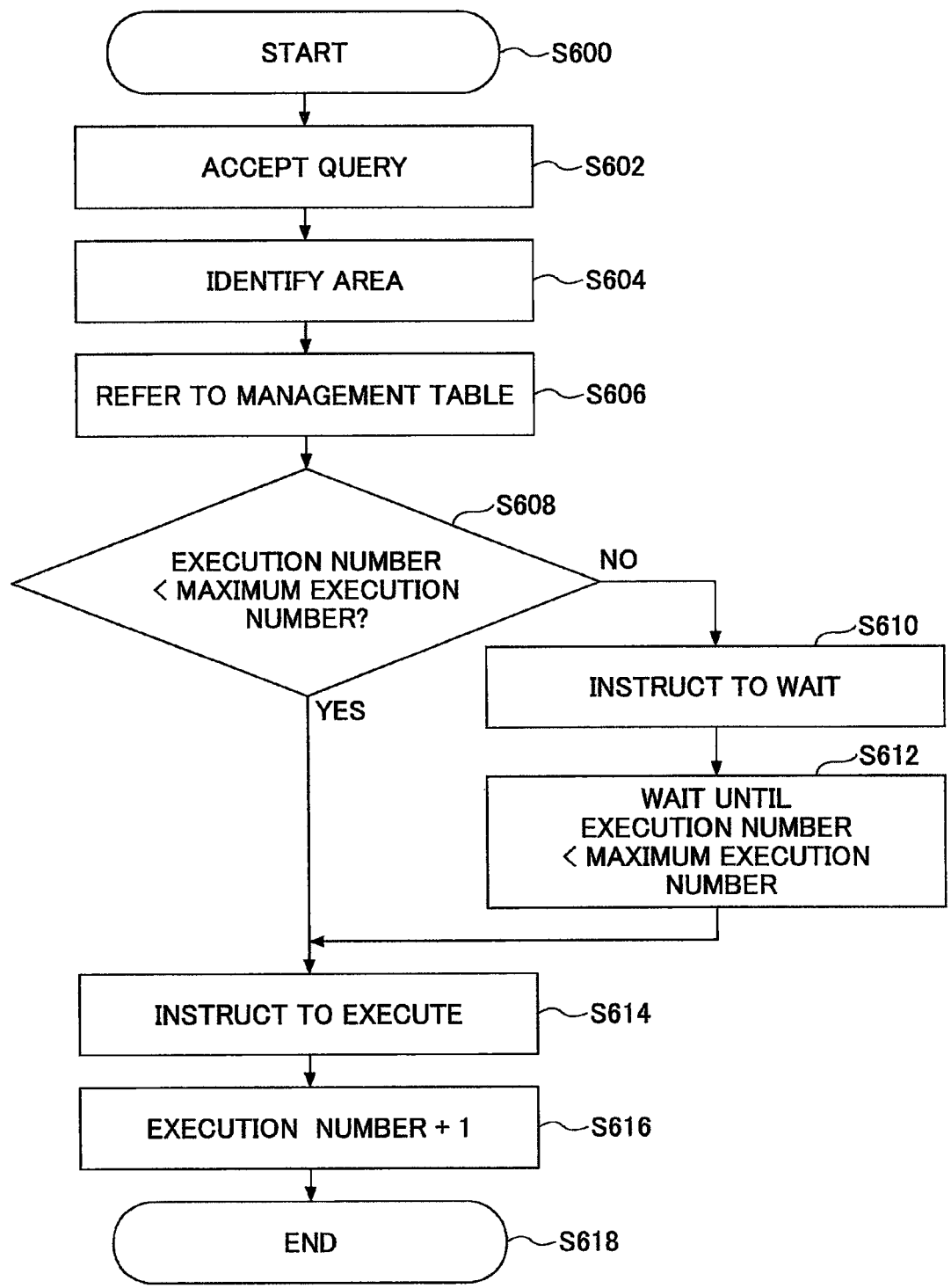
FIG. 6 is a drawing illustrating a flowchart of procedures performed by a server according to an embodiment of the invention.

Referring to FIG. 6, a flowchart of procedures performed by the server 100 having received the query from the information processing device 124 is illustrated. The query accepting part 330 of the server 100 receives the query from the information processing device 124 (Step S602). The area identifying part 332 refers to the location information transmitted with or in the query and identifies Area B in which the information processing device 124 is installed (Step S604). The instructing part 334 refers to the management table of execution number (FIG. 7) stored in the management table storage part 336, and obtains the maximum execution number and the execution number (Step S606). As stated above, the maximum execution number means the maximum number of the information processing devices (i.e. MFP) executing the information processing (i.e. print processing) in parallel. The maximum execution number may be defined by a system administrator. The execution number means the number of the information processing devices actually executing the information processing in each area.

Figures 7, 8:
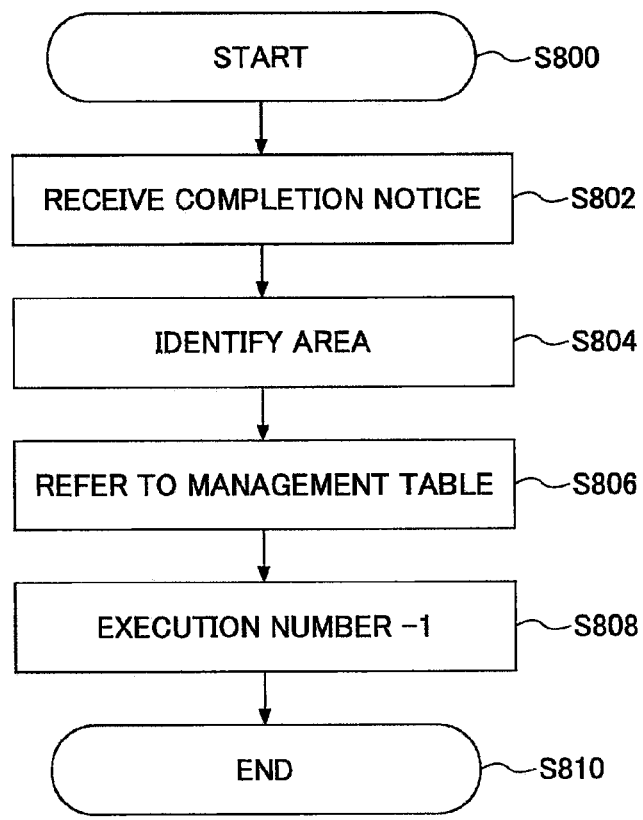
FIG. 7 is a drawing illustrating a Management Table to manage the number of information processing devices executing information processing in an embodiment of the invention.
FIG. 8 is a drawing illustrating a flowchart of procedures performed by a server according to an embodiment of the invention.

In Area B, the maximum execution number is 1 and the execution number is 0 in FIG. 7, thus the instructing part 334 instructs the information processing device 124 to execute the print processing (Steps S608, S614, and Step S520 in FIG. 5). Then the execution number stored in the management table of execution number is incremented by 1 (Step S616). Therefore, the execution number becomes "1" from "0" on the table.

Referring to FIG. 5, the executing part of the information processing device 124 executes the print processing (Step S522) in response to the instruction from the server 100 at Step 520. At this time in the example, an additional print request from the user terminal is received at the information processing device 122. In common with the information processing device 124, the information processing device 122 sends a query to the server 100 whether execution of the print processing is allowed (Steps S540, S550 and S552).

Referring to FIG. 6, the server 100 receives the query and the location information, and determines that the information processing device 122 belongs to Area B (Steps S600 through S604). The server 100 refers to the management table of execution number, and obtains the maximum execution number and the execution number (Step S606). Here, the current execution number is "1" unlike the above mentioned case of the information processing device 124 (S648, No). Thus, the instructing part 334 instructs the information processing device 122 to wait without execution of the print processing (Steps S608, S610, and Step S560 in FIG. 5). The instructing part 334 waits until the execution number falls below the maximum execution number in the management table of execution number (Step S612).

Referring to FIG. 5, the executing part 340 of the information processing device 122 waits based on the instruction from the server 100. However, when the information processing device 124 completes the print processing, the executing part 340 of the information processing device 124 transmits a completion notice to the server 100 (Step S524).

Referring to the FIG. 8, a flowchart of procedures performed by the server 100 having received the completion notice from the information processing device 124 is illustrated. The instructing part 334 of the server 100 receives the completion notice of the print processing from the information processing device 124 (Step S802). In case that the location information is transmitted with or in the completion notice, the area identifying part 332 identifies the area in which the information processing device 124 is installed with the location information (Step S804). If the location information is not transmitted, the area identifying part 332 may identify the area with the location information having been received with the query before.

The instructing part 334 refers to the management table of execution numbers (FIG. 7, Step S806 in FIG. 8), and decrements the execution number for Area B (Step S808). Now the execution number becomes "0" from "1", and the print processing of the information processing device 124 completes.

Next, the information processing device 122 waiting at Step S612 in FIG. 6 will start to execute the print processing. The instructing part 334 of the server 100 instructs the information processing device 122 to execute the print processing (Step S614 in FIG. 6, Step S570 in FIG. 5). Then the execution number stored in the management table of execution numbers is incremented (Step S616 in FIG. 6). Therefore, the execution number becomes "1" from "0" on the table.

Referring to FIG. 5, the executing part 340 of the information processing device 122 executes the print processing based on the instruction from the server 100 (Steps S570 through S572). When the executing part 340 completes the print processing, the executing part 340 transmits a completion notice to the server 100 (S574). Finally, the print processing of the information processing device 122 is completed.

FIG. 9 shows an advantageous effect that comes from the above mentioned procedures. FIG. 9A shows transition of energy consumption of two information processing devices which are not based on this invention. Here, assuming that each of the information processing device consumes constant power "A" while print processing, peak energy consumption to be required in Area B may be at most "2A". According to an embodiment of the invention, as shown in FIG. 9B, peak energy consumption in Area B may be reduced to "A".

Therefore the system 1 according to this embodiment of the invention may control the number of the information processing devices working in parallel on an area-specific basis. Thus, the peak energy consumption may be controlled on an area-specific basis. Furthermore, the area in which the information processing devices is located may be found when it is moved by someone because the area of origin may be identified by the location information via the communication device.

4.2 Second Example of Sequence

The second example is described by referring to FIGS. 10 through 14. In the second example, when both of MFPs 122 and 124 belonging to Area B transmit the query for execution of the print processing, the server 100 allows the second MFP to execute the print processing with lower efficiency or performance.

FIG. 10 shows a sequence of actions of the system 1 in the second example. FIG. 4 also illustrates the construction of the system 1 for this example. In common with FIG. 5, the information processing device 124 transmits the query about the print processing prior to the information processing device 122, and completes the processing (Steps S1000 through S1024). The following description will be explained especially for procedures which are different from ones shown in FIG. 5.

Figure 11:
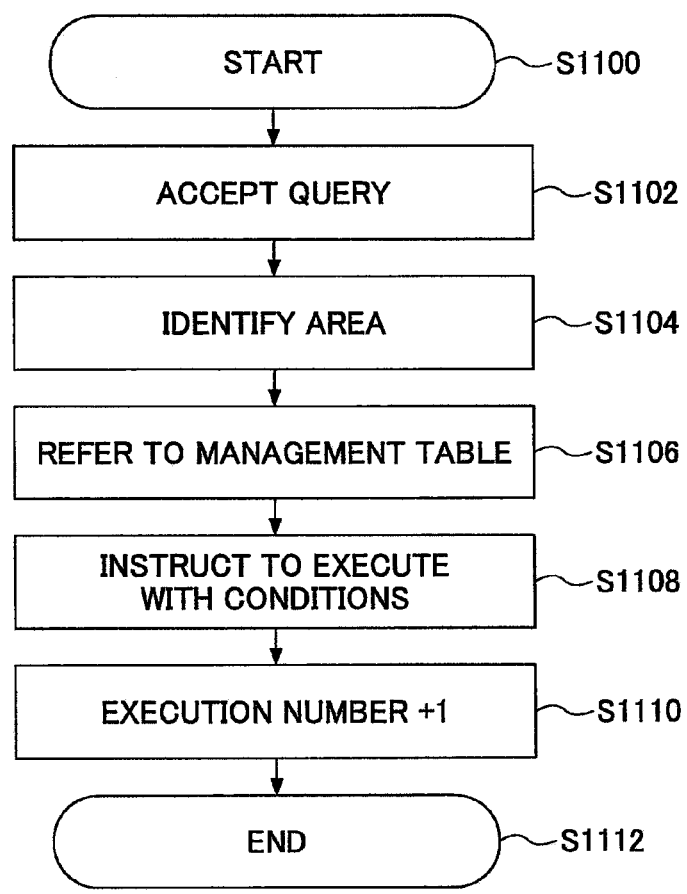
FIG. 11 is a drawing illustrating a flowchart of procedures performed by a server according to an embodiment of the invention.

Referring to FIG. 10, the server 100 receiving the query about execution of the print processing operates according to a flowchart illustrated in FIG. 11. The query accepting part 330 of the server 100 receives the query from the information processing device 124 (Step S1102). The area identifying part 332 refers to the location information transmitted with or in the query and identifies Area B in which the information processing device 124 is installed (Step S1104). The instructing part 334 refers to the management table of execution numbers (FIG. 12) stored in the management table storage part 336, and obtains the maximum execution number and the execution number and conditions for execution (Step S1106). The execution number means the number of the information processing devices actually executing the print processing in Area B at the time when the server 100 receives the query.

Figures 12, 13:
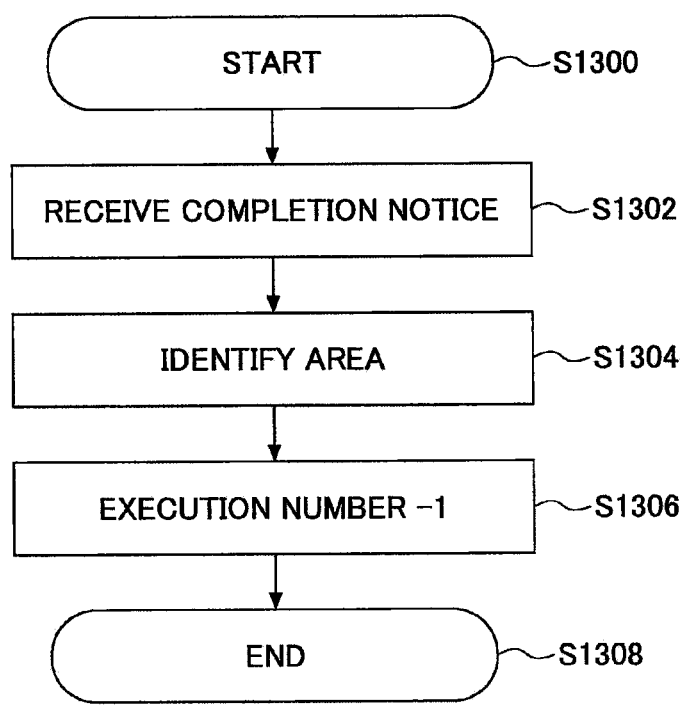
FIG. 12 is a drawing illustrating a table to manage processing condition for information processing devices according to an embodiment of the invention.
FIG. 13 is a drawing illustrating a flowchart of procedures performed by a server according to an embodiment of the invention.

The conditions for execution mean conditions or restrictions for the print processing determined based on the number of the information processing devices executing the processing. FIG. 12 shows a print rate (cpm, the number of copies per minute) as a parameter indicating the conditions for execution of the print processing. However, any parameter may be used. For example a resolution, a volume of toner, a selection of either color or black-and-white mode or the like may be used as the parameter indicating the conditions about the print processing. Here, in Area B, the condition is "60 cpm" because the execution number is "0". Thus the instructing part 334 chooses "60 cpm" as the condition and instructs the information processing device 124 to execute with this condition (Step S1108). The instructing part 334 increments the execution number (Step S1110) which is a variable stored internally, and then finishes the procedure (Step S1112).

In common with the first example, before the information processing device 124 completes the print processing, the information processing device 122 detects a print request from the user terminal and transmits the query about the print processing to the server 100 (Step S1040 through S1052 in FIG. 10). The server 100 receiving the query identifies the area in which the information processing device 122 is installed according to the flowchart illustrated in FIG. 11. Now the execution number for Area B is "1". Thus the server 100 instructs the information processing device 122 to execute the print processing with "30 cpm" (Step S1060 in FIG. 10). The information processing device 122 receiving the instruction executes the print processing with "30 cpm" (Step 1072).

When both of the information processing devices 122 and 124 complete the print processing, they transmit the completion notice to the Server as illustrated in the first example (FIG. 5) (Steps S1024, S1074 in FIG. 10). The server 100 receiving the notice operates according to the flowchart illustrated in FIG. 13. The Steps S1300 through S1304 and S1308 correspond with the Steps S800 through S084 and S808 illustrated in FIG. 8 respectively. At Step S1306, the variable of the execution number stored internally is decremented.

Figure 14A:
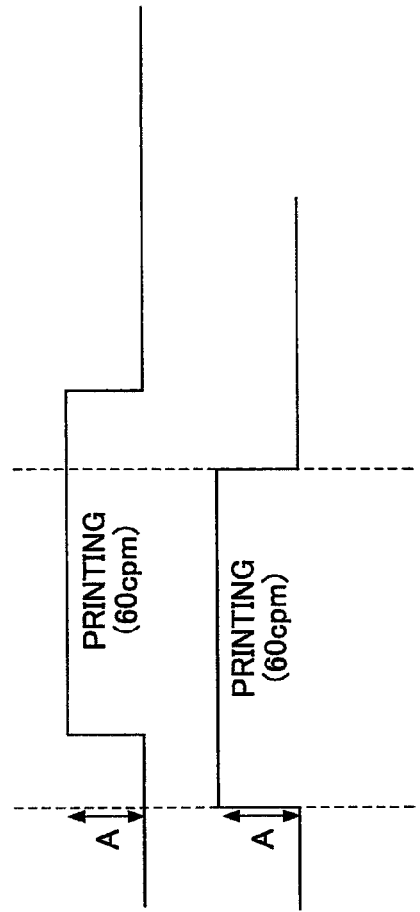
FIG. 14A is a timing chart illustrating an effect produced by a system according to an embodiment of the invention.
Figure 14B:
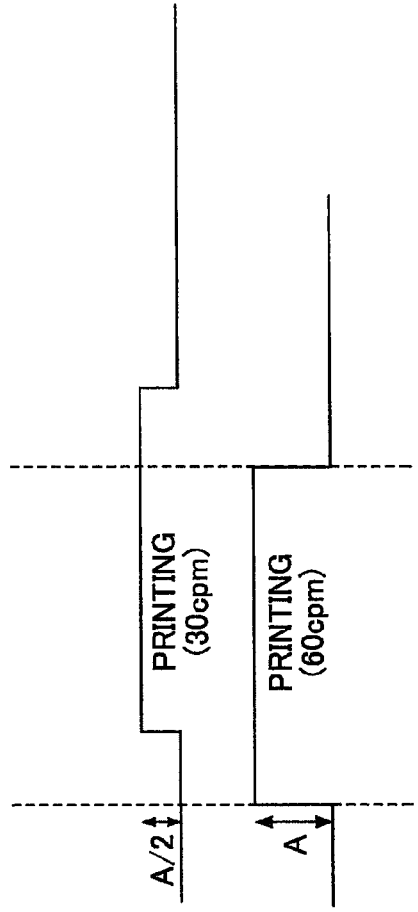
FIG. 14B is a timing chart illustrating an effect produced by a system according to an embodiment of the invention.

FIG. 14 shows an advantageous effect that comes from the above mentioned procedures. FIG. 14A shows transition of energy consumption of two information processing devices 122, 124 which are not based on this invention. Here, assuming that the information processing device consumes constant power "A" on the print condition of "60 cpm", and "A/2" on "30 cpm", energy consumption to be required in Area B is "2A" as shown in FIG. 14A. According to this embodiment of the invention, as shown in FIG. 14B, energy consumption in Area B may be reduced to "1.5A".

Therefore the system 1 according to this embodiment of the invention may control performance/efficiency of the information processing devices and limit the total energy consumption in an area when they work at the same time.

4.3 Third Example of Sequence

The third example is described by referring to FIG. 15 through 18. Here, the sequence of procedures is similar to the first example, but the maximum execution number stored in the management table of execution numbers varies with the number of people in the area (e.g. Area A, B, C, D, or E).

FIG. 15 shows a construction of the system 1 corresponding to FIG. 4. The configuration of the devices in FIG. 15 is in common with FIG. 4. In FIG. 15, each of Areas A, B, C, D, and E represents a room in an office. When a user enters a room, he has to pass his IC card over an IC card reader. A management system which may be separate from the system 1 according to this embodiment of the invention may monitor that action by the user and manage the number of people for each room. The system 1 may obtain a number of people for each room from the management system.

Figures 16, 17:
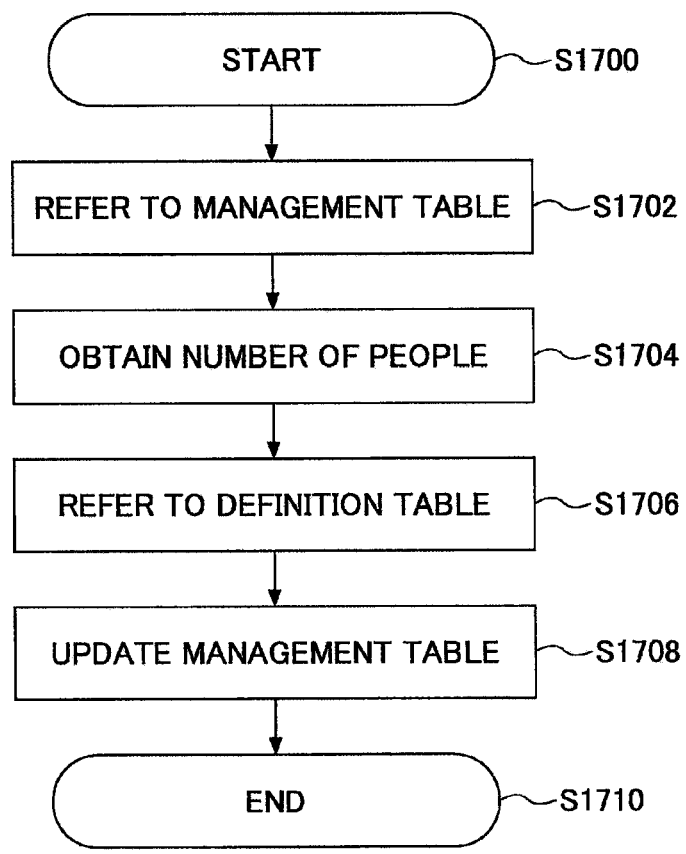
FIG. 16 is a drawing illustrating a table to manage the number of information processing devices according to an embodiment of the invention.
FIG. 17 is a drawing illustrating a flowchart of procedures performed by a server according to an embodiment of the invention.

In this example, the management table updating part 342 updates the management table of execution numbers illustrated in FIG. 16 with the definition table of maximum execution number to the number of people according to the flowchart in FIG. 17. The update may be done at any time such as, but not limited to, at predetermined intervals or at a predetermined time. The update process is described below.

The management table updating part 342 of the server 100 refers to the management table of execution numbers (FIG. 16) and acquires the maximum execution number for each area (Step S1702). For example, the maximum execution number is "1" for Area B. Then, the management table updating part 342 obtains the number of people for each area from the management system (Step S1704). Here, the number obtained is "6" for Area B as shown in FIG. 15. The management table updating part 342 refers to the definition table of maximum execution number to the number of people (FIG. 18) and obtains the maximum number to the number of people (Step S1706). The definition table of maximum execution number to the number of residing person is defined on an area-specific basis. In Area B, the number of people is and thus the maximum execution number is The management table updating part 342 updates the maximum execution number in the management table of execution numbers with the maximum number obtained (Step S1708). The maximum execution number in FIG. 16 then becomes "2" for Area B.

Therefore the system 1 according to this embodiment of the invention may control the number of the information processing devices which may execute the information processing in parallel based on the number of people on an area-specific basis. Thus peak energy consumption may be controlled on an area-specific basis efficiently by defining the peak number of the devices which may operate in parallel according to the number of people for each area.

The definition table of maximum execution number to the number of people illustrated in FIG. 18 (for Area B) may be an compiled table for all areas, which eliminates the need for management of a lot of tables.

4.4 Fourth Example of Sequence

The fourth example is described by referring to FIGS. 19 through 22. Here, the sequence of procedures is similar to the first or third example, but the maximum execution number stored in the management table of execution numbers varies with time.

Figure 19:
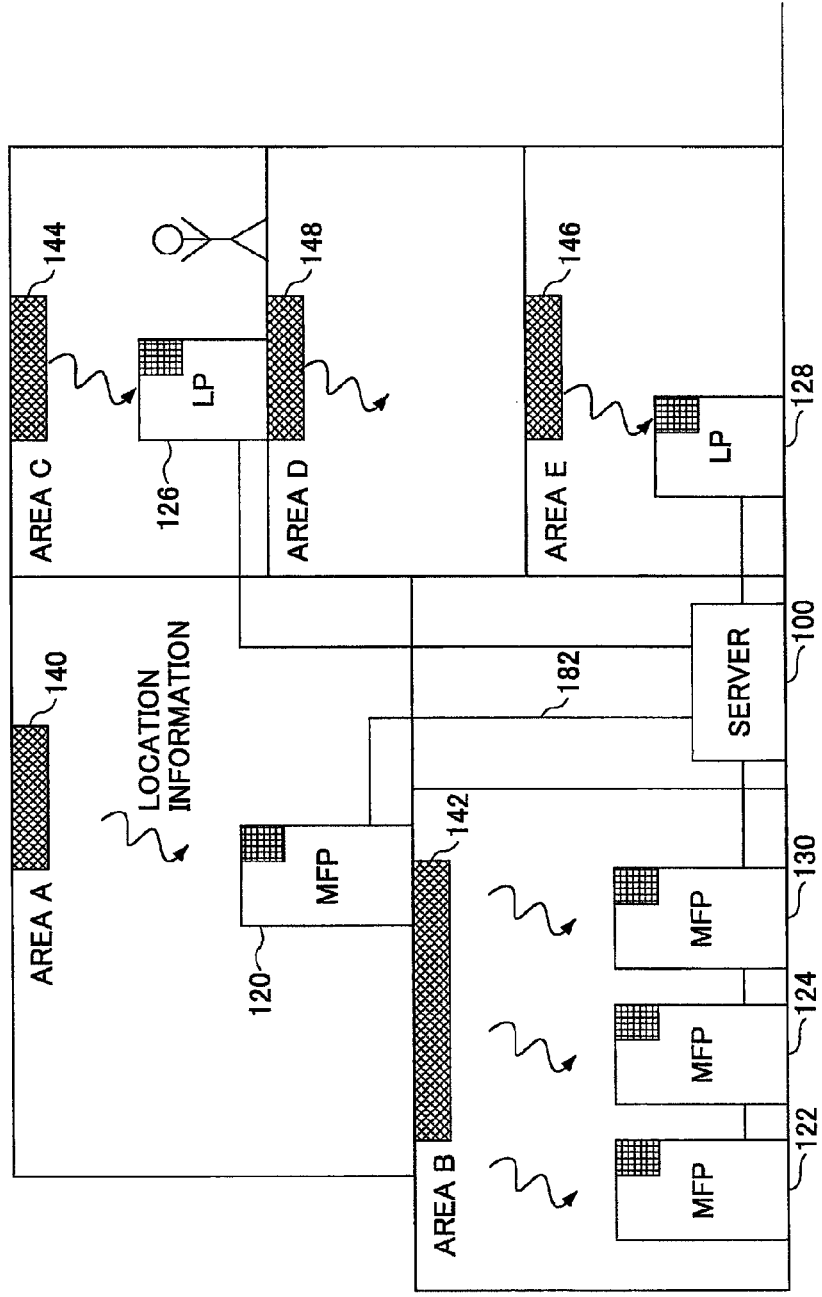
FIG. 19 is a drawing illustrating a system according to an embodiment of the invention.
Figures 20, 21:
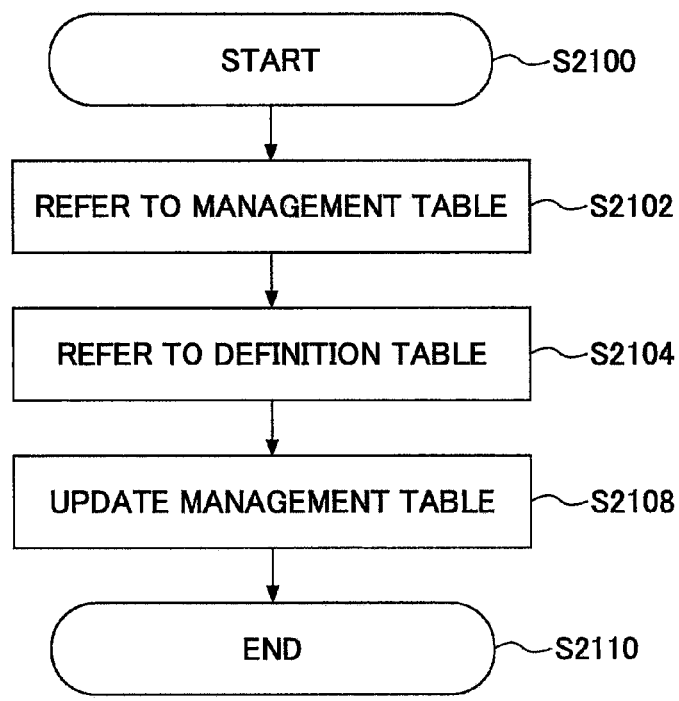
FIG. 20 is a drawing illustrating a table to manage the number of information processing devices in an embodiment of the invention.
FIG. 21 is a drawing illustrating a flowchart of procedures performed by a server according to an embodiment of the invention.

FIG. 19 shows a construction of the system 1 corresponding to FIG. 4. The configuration of the devices in FIG. 19 is in common with FIG. 4 except the number of the information processing devices in Area B. FIG. 20 shows the management table of execution number in the system 1 of this embodiment.

In this example, the management table updating part 342 updates the management table of execution number illustrated in FIG. 20 with the definition table of the maximum execution numbers to time according to the flowchart in FIG. 21. The update may be done at any time such as, but not limited to, at predetermined intervals or at predetermined time. The update process is described below.

The management table updating part 342 of the server 100 refers to the management table of execution number (FIG. 20) and acquires the maximum execution number for each area (Step S2102). For example, the maximum execution number is "2" for Area B. Then, the management table updating part 342 refers to the definition table of the maximum execution number to time (FIG. 22) and obtains the maximum execution number corresponding to the current time (Step S2104). For example if the current time is "13:30"; the maximum execution number for Area B is "3". The management table updating part 342 updates the maximum execution number in the management table of execution number with the maximum number obtained (Step S2108). The maximum execution number in FIG. 20 then becomes "2" for Area B.

Therefore the system 1 according to this embodiment of the invention may control the number of the information processing devices which may execute the information processing in parallel based on time. Thus, peak energy consumption may be controlled on an area-specific basis efficiently by defining the maximum number of the devices which may operate in parallel according to time.

The definition table of maximum execution number to time illustrated in FIG. 22 (for Area B) may be a compiled table for all areas, which eliminates the need for management of a lot of tables.

The present application is based on Japanese Priority Application No. 2012-116175 filed on May 22, 2012 with the Japanese Patent Office, the entire contents of which are hereby incorporated by reference.

What is claimed is:

1. A system, comprising:
   information processing devices; and
   a server which controls information processing executed by the information processing devices;
   wherein one of the information processing devices includes,
      a querying part configured to transmit a query to the server to determine whether the one of the information processing devices is permitted to execute the information processing,
      a notifying part configured to notify the server of location information indicating a location of the one of the information processing devices, and
      an executing part configured to execute the information processing in response to an instruction from the server, and
   wherein the server includes,
      a receiving part configured to receive the query from the one of the information processing devices,
      an identifying part configured to identify an area in which the one of the information processing devices exists according to the location information notified by the one of the information processing devices which has transmitted the query, and
      an instructing part configured to instruct the one of the information processing devices which has transmitted the query to execute the information processing based on a plurality of conditions for execution associated with the area, a first one of the plurality of conditions for execution being based on a number of other information processing devices that are executing the information processing in the area, and a second one of the plurality of conditions for execution being based on a number of copies per minute (CPM) being executed by each of the information processing devices that are executing the information processing in the area, and wherein,
      the instructing part is configured to instruct the one of the information processing devices which has transmitted the query to execute the information processing at a desired CPM based on the second one of the plurality of conditions.

2. The system as claimed in claim 1, wherein the instructing part instructs the information processing device which has transmitted the query to wait before the execution of the information processing when a number of the other information processing devices executing the information processing in the area is equal to or greater than the predetermined number.

3. The system as claimed in claim 2, wherein the predetermined number is determined based on a number of people detected in the area.

4. The system as claimed in claim 2, wherein the predetermined number is responsive to time.

5. The system as claimed in claim 1, wherein the instructing part controls quality or performance of the information processing executed by the one of the information processing devices which has transmitted the query according to the number of the other information processing devices executing the information processing in the area.

6. The system as claimed in claim 5, wherein the information processing includes print processing, and the instructing part controls a print count per units of time of the print processing executed by the one of the information processing devices which has transmitted the query according to a number of the other information processing devices executing the print processing in the area.

7. The system as claimed in claim 1, wherein the system further comprises a communication device relaying communication between the one of the information processing devices and the server, the communication device including:
   a transmitting part to transmit location information indicating location in the area to the one of the information processing devices in the area; and
   a relaying part to relay the query transmitted by the one of the information processing devices which has received the location information to the server.

8. The system as claimed in claim 7, wherein the transmitting part transmits the location in conformity with the IMES standard.

9. The system of claim 1, wherein a third one of the plurality of conditions is based on a power consumption of the information processing devices in the area.

10. A method to control information processing executed by one of a plurality of information processing devices, the method comprising:
   receiving, by a server, a query from one of the plurality of information processing devices to execute information processing;
   receiving location information indicating a location of the one of the plurality of information processing devices;
   identifying, by the server, an area in which the one of the plurality of information processing devices exists; and
   instructing the one of the plurality of information processing devices to execute the information processing based on a plurality of conditions for execution associated with the area, a first one of the plurality of conditions for execution being based on a number of other information processing devices that are executing the information processing in the area, and a second one of the plurality of conditions for execution being based on a number of copies per minute (CPM) being executed by each of the information processing devices that are executing the information processing in the area, and the instructing includes instructing the one of the information processing devices which has transmitted the query to execute the information processing at a desired CPM based on the second one of the plurality of conditions, and
   the one of the plurality of information processing devices executing the information processing in response to the instructing.

11. A server controlling information processing executed by one of information processing devices, the server comprising:
   a receiving part configured to receive a query about whether the one of the information processing devices is permitted to execute the information processing from the one of the information processing devices;
   an identifying part configured to, according to location information notified by the one of the information processing devices which has transmitted the query, identify an area in which the one of the information processing devices exists; and
   an instructing part configured to instruct the one of the information processing devices which has transmitted the query to execute the information processing based on a plurality of conditions for execution associated with the area, a first one of the plurality of conditions for execution being based on a number of other information processing devices that are executing the information processing in the area, and a second one of the plurality of conditions for execution being based on a number of copies per minute (CPM) being executed by each of the information processing devices that are executing the information processing in the area, and wherein,
the instructing part is configured to instruct the one of the information processing devices which has transmitted the query to execute the information processing at a desired CPM based on the second one of the plurality of conditions.

* * * * *